United States Patent [19]

Matsumura

[11] Patent Number: 4,804,235
[45] Date of Patent: Feb. 14, 1989

[54] AIR PRESSURE BRAKE SYSTEM FOR A VEHICLE

[75] Inventor: Yoshihiro Matsumura, Kanagawa, Japan

[73] Assignee: Nippon Air Brake Co., Ltd., Kobe, Japan

[21] Appl. No.: 18,608

[22] Filed: Feb. 25, 1987

[30] Foreign Application Priority Data

Feb. 28, 1986 [JP] Japan .................... 61-044775

[51] Int. Cl.⁴ ............................................. B60T 13/26
[52] U.S. Cl. .................... 303/9.68; 303/24.1; 303/9.66
[58] Field of Search ............... 188/195, 349, 181 A; 303/6 A, 6 C, 6 R, 22 R, 23 A, 24 R, 24 A, 24 BB, 24 C, 24 F, 84 A, 84 R, 93, 100, 20, 97, 9.62, 9.66, 9.67, 9.68, 24.1

[56] References Cited

U.S. PATENT DOCUMENTS

| 3,317,251 | 5/1967 | Hambling et al. | 303/24 A |
| 3,600,042 | 8/1971 | Cripe | 303/24 A |
| 3,861,489 | 1/1975 | Lang et al. | 303/20 |
| 3,964,794 | 6/1976 | Scholz | 188/349 X |
| 4,040,673 | 8/1977 | Ahdus et al. | 303/6 C |
| 4,093,316 | 6/1978 | Reineke | 303/100 |
| 4,113,318 | 9/1978 | Doi | 303/24 F |
| 4,217,005 | 8/1980 | Takata | 303/24 F |
| 4,327,414 | 4/1982 | Klein | 303/93 X |
| 4,352,405 | 10/1982 | Marandet | 303/24 A |
| 4,402,047 | 8/1983 | Newton et al. | 303/100 X |

FOREIGN PATENT DOCUMENTS

| 3413759 | 4/1984 | Fed. Rep. of Germany | 303/22 R |
| 55-68449 | 5/1980 | Japan | 303/24 A |

Primary Examiner—Andres Kashnikow
Assistant Examiner—Timothy Newholm
Attorney, Agent, or Firm—James P. Ryther

[57] ABSTRACT

A vehicle air brake system including a deceleration sensing device having a piston cooperating with a lever carrying a magnetic roller for operating a reed switch. Movement of the piston depends upon the magnitude of the air pressure acting on it, and such pressure is proportional to the degree of brake energization. Movement of the piston moves the lever to vary the degree of deceleration required to move the roller for operating the reed switch. Operation of the reed switch operates an electro-magnetic valve to modulate the degree of braking force applied to the front and rear vehicle axles.

7 Claims, 2 Drawing Sheets

AIR PRESSURE BRAKE SYSTEM FOR A VEHICLE

BACKGROUND OF THE INVENTION

1. Field of the Invention

This invention relates to an air pressure brake system, and more particularly to an air pressure brake system suitable for a large vehicle such as a truck and a bus, in consideration of the load condition of the vehicle.

2. Description of the Prior Art

For example, the system described in the Japanese patent opening gazzette No. 75246/1981, the mechanical linkage mechanism is used for detecting or sensing the load to the vehicle. However, it consumes much time to mount the above-described mechanism onto the vehicle so as to obtain a detecting accuracy within a predetermined range.

SUMMARY OF THE INVENTION

Accordingly, it is an object of this invention to provide an air pressure brake system which can be simply mounted onto the vehicle.

Another object of this invention is to provide an air pressure brake system which can effect a pressure-reducing proportional control accurately in accordance with the load condition of the vehicle.

In accordance with an aspect of this invention, an air pressure brake system for a vehicle comprises; (A) a brake valve for supplying pressurized air of pressure in accordance with the brake operation of the driver; (B) a brake actuating apparatus for receiving said pressurized air from said brake valve; (C) a control valve apparatus arranged between said brake valve and said brake actuating apparatus; (D) deceleration detecting means for detecting occurrence of reference decelerations so set as to be changed in accordance with brake pressures; (E) electro-magnetic valve means to be operated on the basis of the detecting signal of said deceleration detecting means, arranged in relation to said control valve apparatus; and (F) said control valve apparatus including a movable body which has a first pressure receiving surface for receiving the pressurized air from said brake valve at its one end side, a second pressure receiving surface for receiving the pressurized air through said electro-magnetic valve means from said brake valve and a third pressure receiving surface for receiving the pressurized air to be supplied to said brake actuating apparatus, wherein said movable body opens and closes said control valve apparatus by the difference between one urging force applied to said movable body in one direction due to the pressurized air and another urging force applied to said movable body in another direction due to the pressurized air, and a pressure reducing control is effected for said brake actuating apparatus in accordance with the pressure of the pressurized air locked in a chamber facing to said second pressure receiving surface of the movable body.

The foregoing and other objects, features, and advantages of the present invention will be more readily understood upon consideration of the following detailed description of the preferred embodiment of the invention, taken in conjunction with the accompanying drawings.

DESCRIPTION OF THE PREFERRED EMBODIMENT

Next, an air pressure brake system according to one embodiment of this invention will be described with reference to the drawings.

Figure 1:
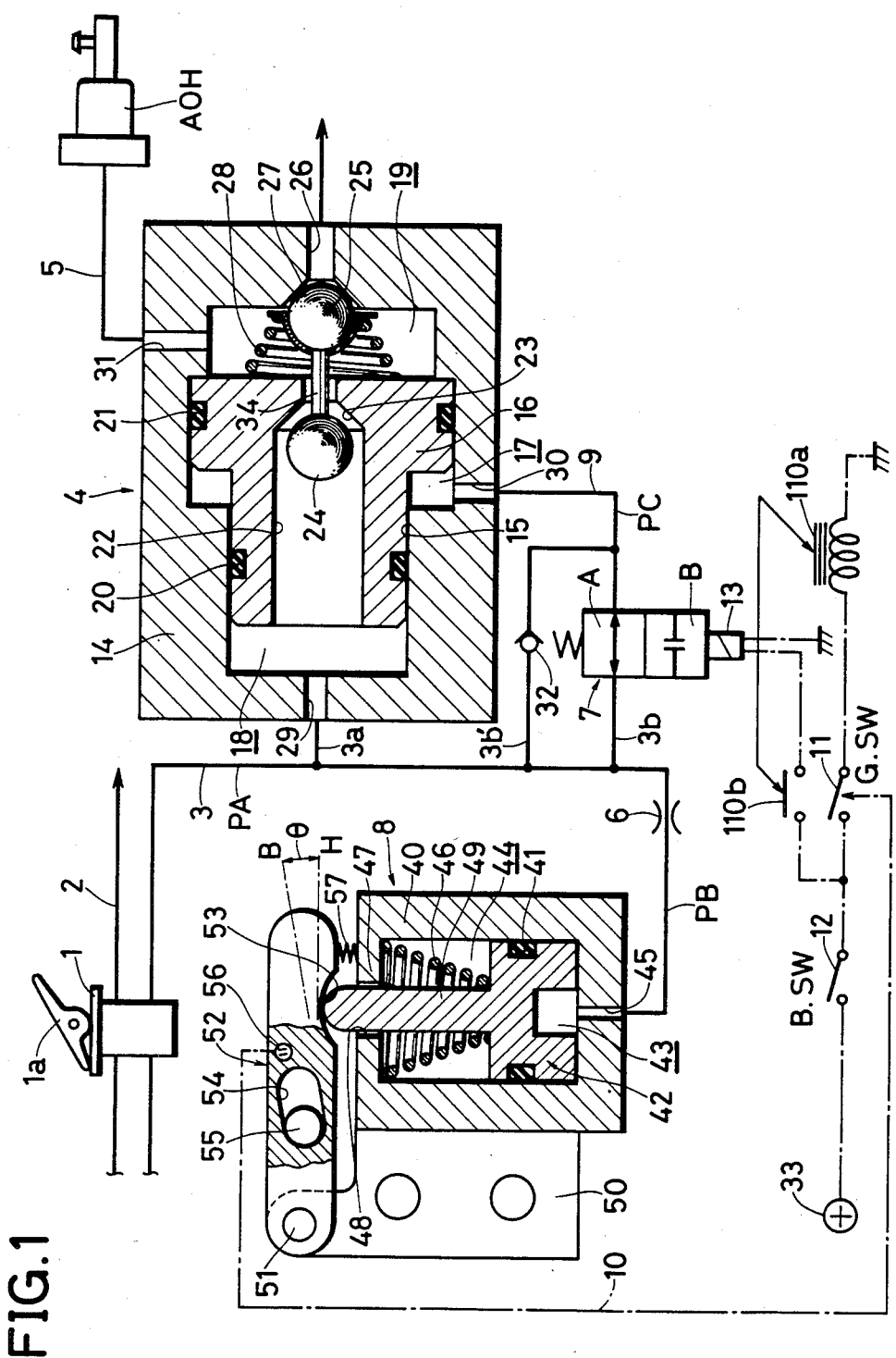
FIG. 1 is a cross-sectional view showing an air pressure brake system according to one embodiment of this invention.

Referring to FIG. 1, a conduit 2 connected to one outlet port of a brake valve 1 is connected through a not-shown air-over hydraulic booster or pneumatic-hydraulic booster to wheel cylinders of front wheels. A conduit 3 connected to another outlet port of the brake valve 1 is divided into conduits 3a and 3b. The one conduit 3a is connected through a control valve apparatus 4 to be described hereinafter in detail and a conduit 5 to an air-over hydraulic booster AOH. A hydraulic output pressure of the AOH is supplied to wheel cylinders of rear wheels.

The other conduit 3b is connected through an electro-magnetic change-over valve 7 and a conduit 9 to the control valve apparatus 4. The main conduit 3 is further connected through a throttle 6 to a reference deceleration setting/detecting apparatus 8 to be described hereinafter in detail. When the reference deceleration setting/detecting apparatus 8 detects the reference deceleration, the detecting signal is supplied through an electric wire 10 to a load condition judging switch 11, and so the switch 11 is closed.

The load condition judging switch 11 is connected in series with a brake switch 12 which is closed by treading a brake pedal 1a of the brake valve 1. A stationary contact of the brake switch 12 is connected to a battery 33. A movable contact of the load condition judging switch 11 is connected to a relay solenoid 110a. When the relay solenoid 110a is energized, its contact 110b is closed to energize a solenoid portion 13 of the electro-magnetic change-over valve 7. When the solenoid portion 13 is not energized, the electro-magnetic change-over valve 7 takes a position A to make its input port and output port communicating with each other. And when the solenoid portion 13 is energized, the electro-magnetic change-over valve 7 takes another position B to make its input port and output port interrupting from each other.

Next, the control valve apparatus 4 will be described in detail.

A stepped hole 15 is formed in a main body 14. A stepped piston 16 provided with seal rings 20 and 21 is slidably fitted into the stepped hole 15. An input chamber 18 and an output chamber 19 are formed at both sides of the stepped piston 16, respectively. A control chamber 17 is formed between the seal rings 20 and 21 around the smaller diameter portion of the stepped piston 16.

A central through hole 22 is formed in the stepped piston 16. The right opening end portion of the central through hole 22 is reduced in diameter, through which a rod 34 is inserted. Valve balls 24 and 25 are fixed at both ends of the rod 34, respectively. A spring 28 is extended between the stepped piston 16 and the right valve ball 25, so that the left valve ball 24 and the stepped piston 16 are located at the shown position at which the control valve apparatus 4 is under an air supply condition, where the left valve ball 24 is separated from a valve seat 23, while the right valve ball 25 seats on a valve seat 27. Accordingly, the input chamber 18 and the output chamber 19 communicate with each other, and the output chamber 19 is intercepted from the atmosphere. When the right valve ball 25 is separated from the valve seat 27, the output chamber 19 is made to communicate through a discharge port 26 with the atmosphere.

The input chamber 18 is connected through an input port 29 and the conduit 3a to the brake valve 1. The control chamber 17 is connected through a control port 30 and the conduit 9 to the electro-magnetic change-over valve 7. The output chamber 19 is connected through an output port 31 and the conduit 5 to an air pressure chamber of the air-over hydraulic booster AOH. A check valve 32 is connected in a conduit 3b' which is connected in parallel with the conduit 3b.

Next, the reference deceleration setting/detecting apparatus 8 will be described in detail.

A piston 42 provided with a seal ring 41 is slidably fitted into a hole of a main body 40. An atmospheric chamber 44 and an air pressure chamber 43 are formed above and under the piston 42, respectively. The air pressure chamber 43 is connected through an input port 45 and the conduit 3 to the brake valve 1. A spring 46 compressed between an upper wall portion 47 of the main body 40 and the piston 42 urges the piston 42 downwards, and so the piston 42 normally contacts with the bottom of the main body 40. An opening 48 is formed in the upper wall portion 47 of the main body 40, and a rod portion 49 of the piston 42 passes through the opening 48.

The main body 40 is fixed to a part (not shown) of the chassis of the vehicle through its mounting portion 50. A detecting lever 52 is pivoted to a pin 51 fixed on the upper end portion of the mounting portion 50. A recess 53 is formed in the lower surface of the detecting lever 52, which contacts with the upper end of the rod portion 49 of the piston 42. A spring 57 is extended between the detecting lever 52 and the main body 40, and it makes the rod portion 49 and the lever 52 take normally the shown stable position.

A detecting roller 55 made of permanent magnet material is arranged in an internal space 54 formed in the lever 52. The bottom surface of the internal space 54 is inclined by an angle $\theta$ relative to the horizontal line H, as shown by the dot-dash line B. Accordingly, the detecting roller 55 is normally contacting with the left end wall of the internal space 54. A reed switch 56 is embedded in the right end wall portion adjacent to the right end wall surface.

When the detecting roller 55 rolls rightwards and contacts with the right end wall of the internal space 54, or comes near it, the reed switch 56 is closed by magnetic force of the detecting roller 55. Accordingly, the load condition judging switch 11 is closed.

When the air pressure supplied to the port 45 increases so high as to overcome the spring force of the spring 46, the piston 42 starts to rise. Accordingly, the detecting lever 52 is pushed upwards by the rod portion 49 of the piston 42, and it is rotated counter-clockwise around the pin 51. The inclination angle $\theta$ of the bottom surface of the internal space 54 increases relation to the horizontal line H. The relationship between the inclination angle $\theta$, therefore, the reference deceleration $\alpha/g$ and the air pressure $P_B$ (kg/cm$^2$) is so designed as to be shown, for example, in FIG. 2. When the air pressure in the air pressure chamber 43 is lower than about 1.2 kg/cm$^2$, the piston 42 remains stopped, and so the inclination angle $\theta$ of the bottom surface of the internal space 54 is constant at about three degrees. The inclination angle $\theta$ increases nearly in proportion with the air pressure above about 1.2 kg/cm$^2$. The deceleration of the vehicle to roll the detecting roller 55 due to the inertia in the internal space 54 increases with the inclination angle $\theta$. According to this embodiment, the deceleration as reference is so designed as to be changed as the curve shown in FIG. 2.

Figure 2:
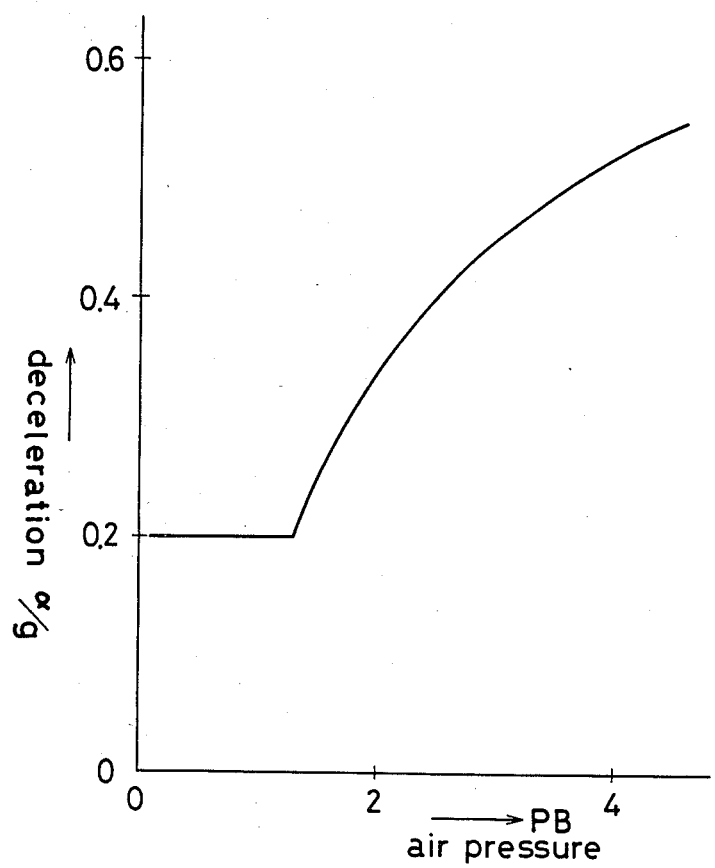
FIG. 2 is a graph showing the characteristics of the reference deceleration setting/detecting apparatus in FIG. 1.

It is considered that theoretical relationships between air pressures supplied to the air-over hydraulic booster and decelerations of the vehicle are obtained for the full-load condition of the vehicle and for the no-load condition of the vehicle. However, according to this embodiment, the characteristic curve of FIG. 2 is so designed that the relationship between the vehicle decelerations detected by the reference deceleration setting/detecting apparatus 8 and the air pressures coincides with the theoretical relationship for the half-load condition of the vehicle.

Accordingly, when the pedal 1a of the brake valve 1 is trodden, and the reed switch 56 remains open, therefore the load condition judging switch 11 is not closed, it is judged that the actual load condition of the vehicle is between the full load condition and the half load condition. And when the reed switch 56 closes, therefore the load condition judging switch 11 is closed, it is judged that the actual load condition of the vehicle is between the half load condition and the no-load condition. In the former judging case, the air pressures to the rear wheel side and front wheel side are increased equally to each other. In the latter judging case, the air pressure to the rear wheel side is increased at the reduced rate in comparison with the air pressure to the front wheel side from the control start air pressure.

The pressure-reducing proportional control is effected under the following relationship formula:

$$P_o = (S_2/S_1) \cdot P_i + P_c \cdot [(S_1 - S_2)/S_1]$$

, where S1 represents the cross-sectional area of the larger diameter portion of the stepped piston 16, S2 that of the smaller-diameter portion of the stepped piston 16, Pi the air pressure of the input chamber 48, Po the air pressure of the output chamber 19 and Pc the air pressure of the air locked in the control chamber 17 by the closing of the electro-magnetic change-over valve 7. The air pressure Pc is constant. When the air is locked in the control chamber 17, the above reducing pressure proportional control is effected.

The resistance of the throttle 6 is so designed that the air pressures in the air pressure chamber 43 of the reference deceleration setting/detecting apparatus 8 and in the air pressure chamber of the air-over hydraulic booster AOH increase nearly at equal speeds in consideration of the great difference between the lengths of the air paths from the brake valve 1 to the apparatus 8 and to the air-over hydraulic booster AOH.

Next, there will be described operations of the above described air pressure brake system.

When the brake pedal 1a of the brake valve 1 is trodden, the air pressure is supplied through the conduit 2 to the air-over hydraulic booster of the front wheel side, and the air pressure is supplied through the conduit 3 to the control valve apparatus 4 and the reference deceleration setting/detecting apparatus 8.

The respective parts of the control valve apparatus 4 are located at the shown positions, where the one valve ball 24 is opened and the other valve ball 25 is closed. Accordingly, the air pressure from the brake valve 1 is supplied through the input chamber 18, the central through hole 22 of the piston 16, the output chamber 19, the output port 31, and the conduit 5 to the air pressure chamber of the air-over hydraulic booster AOH.

The air pressure from the brake valve 1 is further supplied through the conduit 3 and the throttle 6 to the apparatus 8. The air pressure $P_B$ after the throttle 6 lags behind the air pressure $P_A$ before the throttle 6 due to the function of the throttle 6. When the air pressure $P_B$ becomes so high as to overcome the spring force of the spring 46, the piston 42 starts to rise. Accordingly, the detecting lever 52 is rotated counter-clockwise around the pin 51 by the rod portion 49 of the piston 42. The reference deceleration to be detected increases with the air pressure $P_B$ under the relationship shown in FIG. 2.

Further, the air pressure from the brake valve 1 is supplied through the conduit 3b, the electro-magnetic change-over valve 7 whose solenoid portion 13 is not energized, and so which take the position A, and air is supplied through the conduit 9 into the control chamber 17 of the control valve apparatus 4. Accordingly, the piston 16 remains stopped at the shown position, and the left valve ball 24 remains opened, while the right valve ball 25 remains closed.

Now, it is assumed that the load condition of the vehicle is between the half load condition and the full load condition. At that case, the occurring deceleration is lower than the reference deceleration shown in FIG. 2. Accordingly, the detecting roller 55 is not rolled in the internal space 54 of the detecting lever 52 of the apparatus 8. The reed switch 56, and therefore the load condition judging switch 11 are not closed. The electro-magnetic change-over valve 7 is maintained at the position A. Accordingly, the air pressure continues to be supplied into the control chamber 17 of the control valve apparatus 4, and the stepped piston 16 is maintained at the shown position. The equal air pressures are supplied to the air-over hydraulic boosters of the front and rear sides, and the reducing pressure control operation is not effected for the rear wheels.

Next, there will be described the case that the load condition of the vehicle is between the half load condition and the no-load condition.

When the air pressure of the brake valve 1 increases to a certain level such as 2 kg/cm$^2$, the detecting roller 55 is rolled due to the inertia in the reference deceleration setting/detecting apparatus 8, and so the reed switch 56 is closed. Theoretically, it is possible that the reed switch 56 is closed nearly at the same time when the air pressure of the brake valve 1 starts to increase with the treading of the brake pedal 1a. However, the detection of the detecting roller 55 lags by sometime behind the actual deceleration of the vehicle. Further, the rise characteristics of the deceleration is stabilized in some time. Accordingly, when the deceleration of the vehicle has reached to a certain value, the detecting roller 55 starts to be rolled for closing the reed switch 56. After this, the closing of the reed switch 56 is maintained, although the air pressure increases.

The rise of the air pressure $P_B$ of the air pressure chamber 43 of the apparatus 8 is retarded by the throttle 6. Accordingly, the rising speed of the air pressure $P_B$ is nearly equal to that of the air pressure supplied to the air-over hydraulic booster AOH, since the air path length from the brake valve 1 to the air-over hydraulic booster AOH is longer. However, when the reed switch 56 starts to be stably closed, the deceleration has become higher than a certain value.

As above described, it is judged that the load condition of the vehicle is between the half load condition and the no-load condition. The switch 11 is closed, and the solenoid portion 13 is energized to change over the electro-magnetic change-over valve 7 into the position B. The pressurized air of pressure Pc then supplied into the control chamber 17 of the control valve apparatus 4 is locked in the control chamber 17 thereof. Accordingly, the urging force of the piston 16 due to the air pressure is determined by the air pressures of the input and output chambers 18 and 19 and the locked air pressure Pc of the control chamber 17. When the air pressure Pi increases so as to fulfill the condition: $PiS_2 + Pc(S_1 - S_2) = P_0S_1$, the piston 16 starts to move leftwards. While the right valve ball 25 remains seated on the valve seat 27, the left valve ball 24 comes to seat on the valve seat 23. The input and output chamber 18 and 19 are cut off from each other.

When the condition: $PiS_2 + Pc (S_1 - S_2) > PoSi$ is obtained with the increase of the input air pressure Pi, the piston 16 moves rightwards, and the left valve ball 24 is again separated from the valve eat 23. The input and output chambers 18 and 19 are again made to communicate with each other. Hereafter, the seating and separation of the left valve ball 24 on and from the valve seat 23 are repeated with the increase of the input air pressure Pi. Thus, the air pressure Po of the output chamber 19 is controlled under the condition $Po = (S_2/S_1) Pi + Pc \cdot [(S_1 - S_2)/S_1]$. Or the pressure reducing proportional control is effected for the output chamber 19.

When the brake pedal 1a is released from treading for relieving the brake, the air pressure of the input chamber 18 rapidly decreases towards zero, and accordingly the piston 16 is greatly moved leftwards, so that the right valve ball 25 is separated from the valve seat 27, while the left valve ball 24 remains seated on the valve seat 23. Thus, the output chamber 19 is made to communicate with the atmosphere, and so the pressurized air from the air-over hydraulic booster AOH is rapidly exhausted into the atmosphere from the discharge port 26 through the conduit 5, the output port 31 and the output chamber 19. Accordingly, the brake to the rear wheels is rapidly relieved. Before the brake is next applied, the piston 16 is located at the left position in contrast to the shown position, where the right valve ball 24 is closed, and the left valve ball 25 is opened. When the brake is next applied, the piston 16 is moved rightwards to the shown position with the start of the increase of the supplied air pressure.

When the brake is relieved, the pressurized air locked in the control chamber 17 can be returned to the brake valve 1 through the check valve 32 and the conduit 3, and it is discharged from the brake valve 1 into the atmosphere.

There has been above described the case that the brake is normally applied. Next, there will be described the case that the brake is rapidly applied.

When the load condition of the vehicle is the no-load condition or near it, the deceleration of the vehicle very rapidly changes. The rise of the air pressure $P_B$ to the apparatus 8 lags somewhat behind the rise of the air pressure $P_A$ to the air-over hydraulic booster AOH, because of the throttle 6. Actually, the vehicle deceleration lags considerably behind a vehicle deceleration obtained for a brake pressure from the theoretical relationship between the brake pressure and vehicle deceleration. After the detecting roller 55 is rolled to close the read switch 56, hereafter the closing of the reed switch 56 is maintained, and the above described pressure reducing pressure control is effected.

Also when the load condition of the vehicle is the full load condition or near it, the deceleration of the vehicle rapidly rises. Initially, the effect of the throttle 6 is high. Accordingly, the piston 42 of the apparatus 8 slowly rises in comparison with the increase of the air pressure. In the apparatus 8, the detecting roller 55 is temporarily roller to close the reed switch 56. Thus, the above pressure reducing proportional control is effected.

However, when the air pressure $P_B$ of the pressure chamber 43 approaches the output pressure $P_A$ of the brake valve 1, the detecting roller 55 is again returned to the shown original position for opening the reed switch 56. Thus, the electro magnetic change-over valve 7 is again changed over into the position A. The air pressure $P_A$ from the brake valve 1 is further added to the locked air pressure in the control chamber 17. The time when the electro-magnetic change-over valve 7 is changed over into the position B, is very short. Accordingly, the rise of the air pressure $P_A$ of the brake valve 1 is very little for that time, and so the piston 16 of the control valve apparatus 4 is immediately returned to the shown position. After that, the air pressures of the input and output chambers 18 and 19 equally increase.

If the locked pressurized air in the control chamber 17 is so designed as to be discharged into the atmosphere, when the electro magnetic change-over valve 7 is changed over into the position B, a longer time would be required for returning the piston 16 to the shown original position, and so the braking distance would be longer.

While the preferred embodiment has been described, variations thereto will occur to those skilled in the art within the scope of the present inventive concepts which are delineated by the following claims.

For example, in the above embodiment, the reference deceleration detected by the reference deceleration setting/detecting apparatus 8 is so designed as to change from 0.2g to about 0.6g in accordance with the supply air pressures from the brake valve 1. The range of the reference deceleration may be varied in accordance with the load condition of the vehicle to be detected or judged, for example, by changing the spring force of the spring 46 or the length of the rod portion 49.

Plural reference deceleration setting/detecting apparatus may be arranged for judging different load conditions of the vehicle. In that case, the numbers of the electro-magnetic change-over valves and for the steps of the stepped piston of the control valve apparatus are increased in accordance with the number of the reference deceleration setting/detecting apparatus.

Further, in the above embodiment, the load condition judging switch 11 is turned on and off by the ON-OFF signals of the reed switch 56. Instead, the load condition judging switch itself may be used as the reed switch. In that case, the number of the switches can be reduced.

Further, in the above embodiment, the reed switch 56 is normally opened, since the detecting roller 55 is far separated therefrom. Instead, the reed switch 56 may be so arranged as normally to be closed. In that case, it is arranged adjacent to the detecting roller 55 in contrast to FIG. 1. When the reference deceleration is detected, the reed switch 56 is opened.

In this application, the brake valve 1 defines brake valve means for supplying pressurized air in accordance with the braking intensity applied by the vehicle driver. The air-over hydraulic booster or pneumatic-hydraulic booster defines brake actuating means for actuating the brakes with a force proportional to the pressure of the air supplied through the brake valve means. The control valve 4 defines control valve means for controlling the braking force applied to the rear axle brakes in accordance with air pressure signals received from the brake valve means and from an electro-magnetic valve means 7. The deceleration setting/detecting apparatus 8 defines deceleration detecting means for detecting occurrence of reference decelerations of the vehicle that are variable in accordance with braking intensity. The movable member 55 defines inertia responsive movable means for operating signal means 56 to provide a detecting signal indicating that a reference deceleration has been detected. Angle changing means for the inertia responsive movable means 55 includes lever 52 and projection 49 on piston 42. This varies the deceleration force required to operate the movable means 55. The magnitude or intensity of the braking force applied by the vehicle driver provides a proportional air pressure signal to chamber 43 of the deceleration detecting means. With higher braking intensity, lever 52 will move counterclockwise under influence of piston 42 and increase the deceleration force required to operate movable means 55 and thereby operate electro-magnetic valve means 7 to begin modulation of the braking force applied to the vehicle rear axle. The movable means 55 is received in a slanted groove 54 in part of the angle changing means 52 which is movable to change the slant angle, and thereby change the deceleration force required to move the movable means 55. The entire angle changing means includes the entire apparatus 8. The detecting lever 52 may also be termed a movable detecting body. Deceleration detecting means 8, electro-magnetic valve means 7, and control valve means 4 all form part of a control means for modulating the braking force applied to the vehicle rear brakes. Movable member 55 and reed switch 56 form part of signal means for providing a detecting signal when the predetermined deceleration rate is detected, and to then operate electro-magnetic valve means 7 which acts upon control valve means 4 to reduce the braking force applied to the vehicle rear brakes.

What is Claimed

1. An air pressure brake system for a vehicle comprising:
    (A) brake valve means for supplying pressurized air in accordance with the braking intensity applied by the vehicle driver;
    (B) brake actuating means for receiving pressurized air from said brake valve means;
    (C) control valve means arranged between said brake valve means and brake actuating means;
    (D) deceleration detecting means for detecting occurrence of reference decelerations that are variable in accordance with braking intensity; said deceleration detecting means comprising a movable member arranged on a slant, angle changing means for changing the angle of said slant in accordance with braking intensity; and reference deceleration occurrence detecting means for detecting that said movable member has moved upwardly on said slant by the occurring reference deceleration of the vehicle due to its inertia and providing a detecting signal;

(E) electro-magnetic valve means operable in response to said detecting signal of said deceleration detecting means;

(F) said control means including a movable body which has a first pressure receiving surface for receiving the pressurized air from said brake valve means at its one end side, a second pressure receiving surface for receiving the pressurized air through said electro-magnetic valve means from said brake valve means, and a third pressure receiving surface for receiving the pressurized air to be supplied to said brake actuating means, said control valve means including control chamber means for receiving pressurized air acting on said second pressure receiving surface of said movable body; and (G) said movable body being operable to open and close said control valve means by the differential forces applied to said movable body in opposite directions, whereby a pressure reducing control is effected for said brake actuating means in accordance with the pressure of the pressurized air locked in said control chamber means and acting on said second pressure receiving surface of said movable body.

2. An air pressure brake system according to claim 1 wherein pressurized air is supplied to said angle changing means of said deceleration detecting means from said brake valve means, whereby the angle of said slant is changed to thereby change said reference decelerations in accordance with the pressure of the air supplied to said angle changing means.

3. An air pressure brake system according to claim 2, in which throttle means is arranged between said brake valve means and the angle changing means of said deceleration detecting means.

4. An air pressure brake system according to claim 2, in which said angle changing means comprises a main body, a piston slidable in said main body, an air pressure chamber formed at one side of said piston, and a detecting body rotatably supported on said vehicle in contact with said piston, said movable member comprising a detecting roller of magnetic material rollably arranged in a slanted groove in said detecting body, said reference deceleration occurrence detecting means comprising a reed switch to be turned on and off by magnetic flux of said detecting roller, said piston being movable in one direction in accordance with the pressurized air supplied into said air pressure chamber from said brake valve means, and said detecting body being rotatable in one direction in accordance with the movement of said piston.

5. An air pressure brake system according to claim 1, in which said control valve means further includes a main body, and said movable body is movably received in said main body, said main body having input and output chambers on opposite sides of said movable body, and said control chamber means being formed between said input and output chambers, said input chamber communicating with said brake valve means, said output chamber communicating with said brake actuating means, and said control chamber means communicating with said electro-magnetic valve means.

6. An air pressure brake system according to claim 5, in which said movable body is in the form of a stepped piston having a larger diameter portion defining said third pressure receiving surface, a smaller diameter portion defining said first pressure receiving surface, and a stepped portion defining said second pressure receiving surface, said first and third pressure receiving surfaces being at the sides of said input and output chambers, respectively.

7. An air pressure brake system according to claim 6, in which said movable body has a central through hole, and said control valve means further comprises a movable valve body, said central through hole being opened and closed by said movable valve body in accordance with the movement of said movable body.

* * * * *